(12) United States Patent
Kimura et al.

(10) Patent No.: US 11,708,894 B2
(45) Date of Patent: Jul. 25, 2023

(54) SHIFT APPARATUS AND CONTROL METHOD OF SHIFT APPARATUS

(71) Applicant: HONDA MOTOR CO., LTD., Tokyo (JP)

(72) Inventors: Hiroki Kimura, Wako (JP); Satoshi Kono, Wako (JP); Masashi Misawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/210,665

(22) Filed: Mar. 24, 2021

(65) Prior Publication Data

US 2021/0301919 A1 Sep. 30, 2021

(30) Foreign Application Priority Data

Mar. 30, 2020 (JP) .............................. JP2020-059331

(51) Int. Cl.
*F16H 59/08* (2006.01)
*F16H 61/22* (2006.01)

(52) U.S. Cl.
CPC .............. *F16H 59/08* (2013.01); *F16H 61/22* (2013.01); *F16H 2059/081* (2013.01); *F16H 2061/223* (2013.01)

(58) Field of Classification Search
CPC ......... F16H 2061/223; F16H 2059/081; F16H 61/22; F16H 59/08; F16H 61/16
USPC ....................................................... 74/473.3
See application file for complete search history.

(56) References Cited

U.S. PATENT DOCUMENTS

| 4,583,171 | A | * | 4/1986 | Hara | ....................... | F16H 59/12 |
| | | | | | | 477/125 |
| 4,817,471 | A | * | 4/1989 | Tury | ....................... | F16H 61/32 |
| | | | | | | 477/121 |
| 4,922,769 | A | * | 5/1990 | Tury | ....................... | F16H 59/12 |
| | | | | | | 477/131 |

(Continued)

FOREIGN PATENT DOCUMENTS

| CZ | 20041201 A3 | * | 12/2004 | ............. B60R 25/06 |
| EP | 1229272 A2 | * | 8/2002 | ............. B60K 37/06 |
| JP | 2013-47074 | | 3/2013 | |

OTHER PUBLICATIONS

Chinese Office Action with English Translation dated Mar. 30, 2022, 10 pages.

(Continued)

*Primary Examiner* — T. Scott Fix
(74) *Attorney, Agent, or Firm* — Rankin, Hill & Clark LLP

(57) ABSTRACT

An embodiment of the invention is to provide a shift apparatus that performs switching of shift ranges of a vehicle, the shift apparatus including: an operation member; a shift control section; and a regulation mechanism, wherein the shift control section is configured to select a second range when the operation member moves from a first position to a second position before being regulated by the regulation mechanism, and the shift control section is configured to select a first range when that a shift mechanism is in a shift restriction state and the operation member moves from the first position to the second position before being regulated by the regulation mechanism, and to allow an operation control section to execute the regulation by the regulation mechanism.

7 Claims, 9 Drawing Sheets

(56) References Cited

U.S. PATENT DOCUMENTS

| | | | | |
|---|---|---|---|---|
| 5,156,243 | A * | 10/1992 | Aoki | B60K 37/06 |
| | | | | 200/61.54 |
| 5,696,679 | A * | 12/1997 | Marshall | F16H 63/3416 |
| | | | | 701/1 |
| 5,715,161 | A * | 2/1998 | Seo | F16H 61/12 |
| | | | | 701/33.9 |
| 5,738,607 | A * | 4/1998 | Kondo | F16H 61/0248 |
| | | | | 477/142 |
| 6,059,687 | A * | 5/2000 | Durieux | F16H 61/22 |
| | | | | 192/220.2 |
| 6,564,661 | B2 * | 5/2003 | DeJonge | F16H 59/08 |
| | | | | 74/335 |
| 2002/0147067 | A1 * | 10/2002 | Yamauchi | F16H 61/22 |
| | | | | 475/254 |
| 2006/0037424 | A1 * | 2/2006 | Pickering | F16H 59/08 |
| | | | | 74/473.3 |
| 2008/0051250 | A1 * | 2/2008 | Inoue | F16H 61/12 |
| | | | | 477/34 |
| 2010/0292899 | A1 * | 11/2010 | Kitaori | F16H 61/0213 |
| | | | | 701/52 |
| 2013/0047768 | A1 * | 2/2013 | Kamoshida | F16H 61/18 |
| | | | | 74/473.3 |
| 2018/0363774 | A1 * | 12/2018 | Yamamoto | F16H 61/22 |

OTHER PUBLICATIONS

Japanese Office Action with English translation dated Feb. 8, 2022, 7 pages.
Chinese Office Action with English Translation dated Mar. 31, 2022, 10 pages.

* cited by examiner

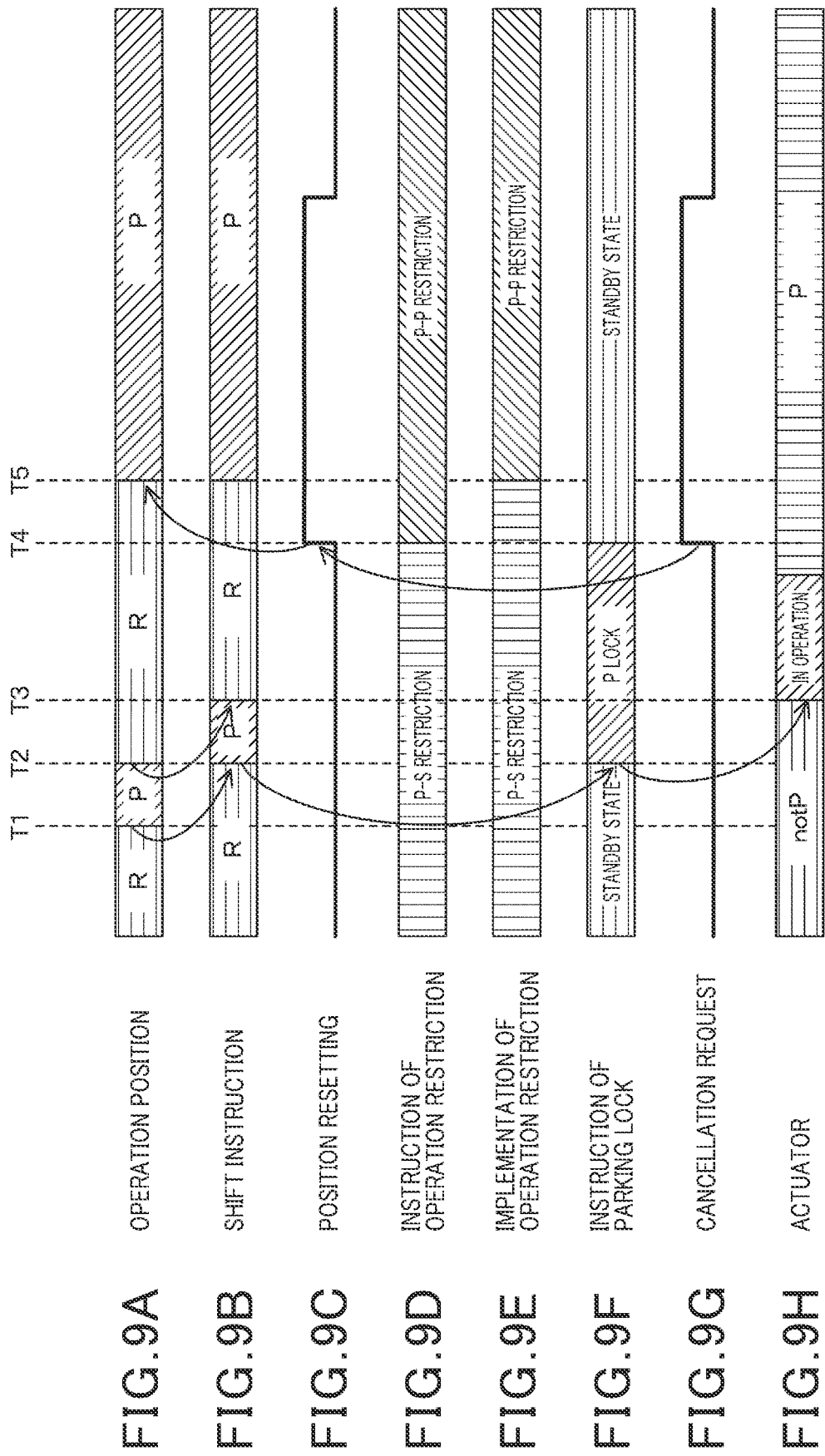

SHIFT APPARATUS AND CONTROL METHOD OF SHIFT APPARATUS

INCORPORATION BY REFERENCE

The present application claims priority under 35 U.S.C. § 119 to Japanese Patent Application No. 2020-059331 filed on Mar. 30, 2020. The content of the application is incorporated herein by reference in its entirety.

BACKGROUND OF THE INVENTION

Field of the Invention

The present invention relates to a shift apparatus and a control method of the shift apparatus.

Description of the Related Art

In the related art, a shift apparatus of vehicle including a dial-shaped operation member has been known. Such a shift apparatus has a P (parking) range selected during parking of the vehicle, and a plurality of shift ranges including an R (reverse), an N (neutral), and a D (drive), and selects the shift range by rotating the operation member. Specifically, the respective shift ranges of P, R, N, D, and S are arranged side by side, and the shift range is selected corresponding to a position of the operation member according to the operation of rotating the operation member.

In a configuration in which a shift operation is performed by rotation of the operation member as in a configuration disclosed in Japanese Patent Laid-Open No. 2013-47074, the restriction on the rotation of the operation member is considered in order to restrict excessive rotation of the operation member and a shift change that suddenly changes the behavior of the vehicle. However, since the dial-shaped operation member can be operated quickly, the restriction on the rotation of the operation member may not be met in time. For example, the operation member may move before the rotation of the operation member is actually restricted.

The present invention is to appropriately regulate the rotation of the operation member in a configuration in which the shift range of the vehicle is switched by the rotation of the operation member.

SUMMARY OF THE INVENTION

An aspect of the present invention is to provide a shift apparatus that is connected to a shift mechanism of a vehicle having a plurality of shift ranges including a first range and a second range and performs switching of the shift ranges, the shift apparatus including: an operation member rotatably attached to the vehicle; a position detection unit configured to detect a position of the operation member; a shift control section configured to select the first range when the operation member moves to a first position, to select the second range when the operation member moves to a second position, and to allow the shift mechanism to execute switching to the selected shift range; a regulation mechanism configured to regulate a rotation of the operation member; an operation control section configured to allow the regulation mechanism to regulate the rotation of the operation member; and a shift state determination section configured to determine a shift restriction state of the shift mechanism, the shift control section being configured to select the second range when the operation member moves from the first position to the second position before being regulated by the regulation mechanism, and the shift control section being configured to select the first range when the shift state determination section determines that the shift mechanism is in a shift restriction state and the operation member moves from the first position to the second position before being regulated by the regulation mechanism, and to allow the operation control section to execute the regulation by the regulation mechanism.

In another aspect of the present invention, the shift mechanism includes a shift lock portion that locks a position of a range in the first range, and the shift state determination section determines that the shift mechanism is in a shift restriction state when a hindrance occurs in releasing the lock of the shift lock portion.

In another aspect of the present invention, the shift state determination section determines that the shift mechanism is in a shift restriction state when a temperature of the shift lock portion exceeds a set temperature range.

In another aspect of the present invention, the shift control section performs control to release the lock of the shift lock portion, and the shift state determination section determines that the shift mechanism is in a shift restriction state when the lock of the shift lock portion is not released within a set time after the shift control section performs control to release the lock.

In another aspect of the present invention, the shift apparatus further includes a display control section configured to allow a display portion mounted on the vehicle to display the shift range selected by the shift control section, wherein the display control section allows the display portion to display the first range after the shift control section selects the first range when the operation member moves from the first position to the second position.

In another aspect of the present invention, the first position and the second position are adjacent to each other in a rotation range of the operation member, and the operation control section allows the regulation mechanism to regulate a rotation of the operation member from the first position to the second position when the display control section allows the display portion to display the first range.

Another aspect of the present invention is to provide a control method of a shift apparatus that is connected to a shift mechanism of a vehicle having a plurality of shift ranges including a first range and a second range and performs switching of the shift ranges, the control method including: detecting a position of an operation member rotatably attached to the vehicle; selecting the first range when the operation member moves to a first position, selecting the second range when the operation member moves to a second position, and allowing the shift mechanism to execute switching to the selected shift range; using a regulation mechanism configured to regulate a rotation of the operation member to regulate the rotation of the operation member; selecting the second range when the operation member moves from the first position to the second position before being regulated by the regulation mechanism; and selecting the first range when the shift mechanism is in a shift restriction state and the operation member moves from the first position to the second position before being regulated by the regulation mechanism, and allowing the operation control section to execute the regulation by the regulation mechanism.

According to the aspects of the present invention, when the operation member is quickly operated in a short time, the shift range can be switched in response to the operation, and the shift range is not switched when the shift mechanism is in the shift restriction state. Therefore, the rotation of the operation member can be appropriately regulated in the configuration in which the shift range of the vehicle is switched by the rotation of the operation member.

BRIEF DESCRIPTION OF THE DRAWINGS

FIGS. 9A to 9H are timing charts showing an operation example of the shift apparatus.

DETAILED DESCRIPTION OF THE PREFERRED EMBODIMENT

1. Overview of Gear Shift of Automobile

Figure 1:
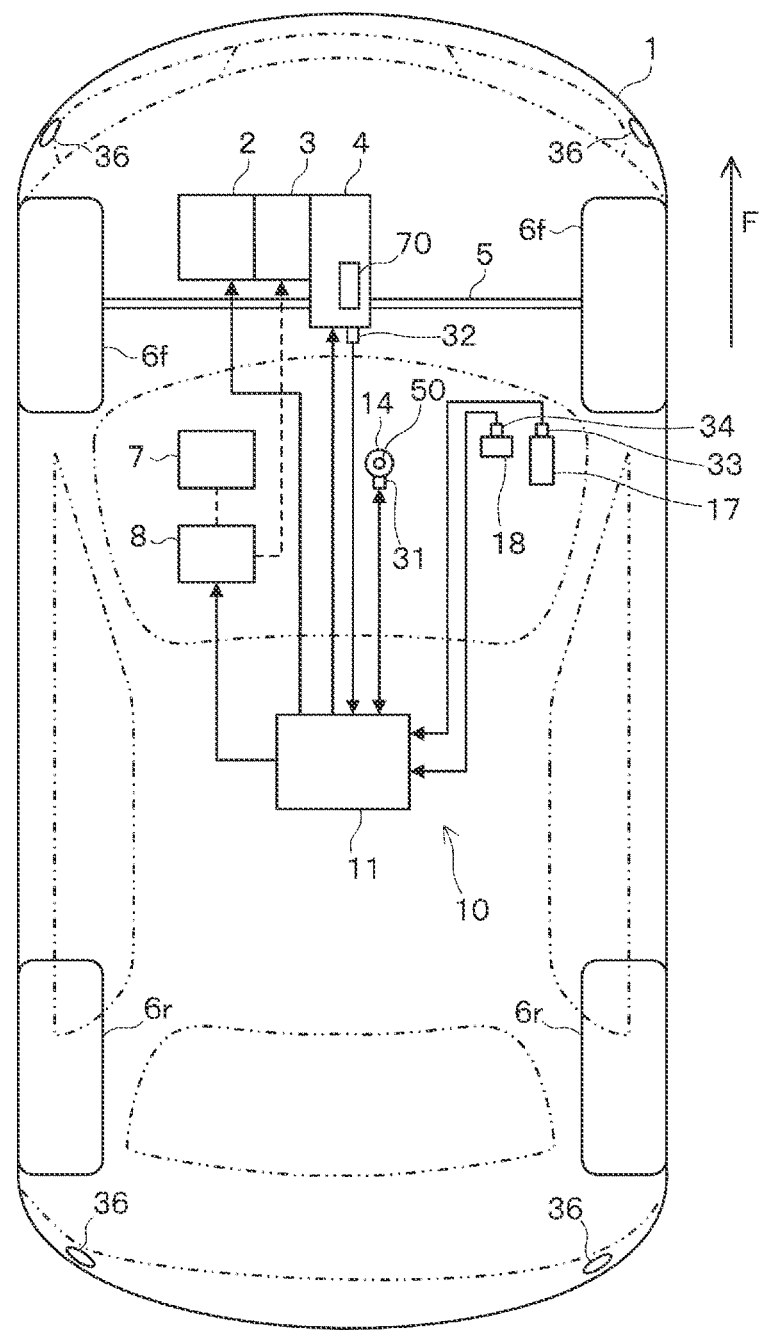
FIG. 1 is a schematic diagram of a drive system of an automobile according to the present embodiment.
Figure 2:
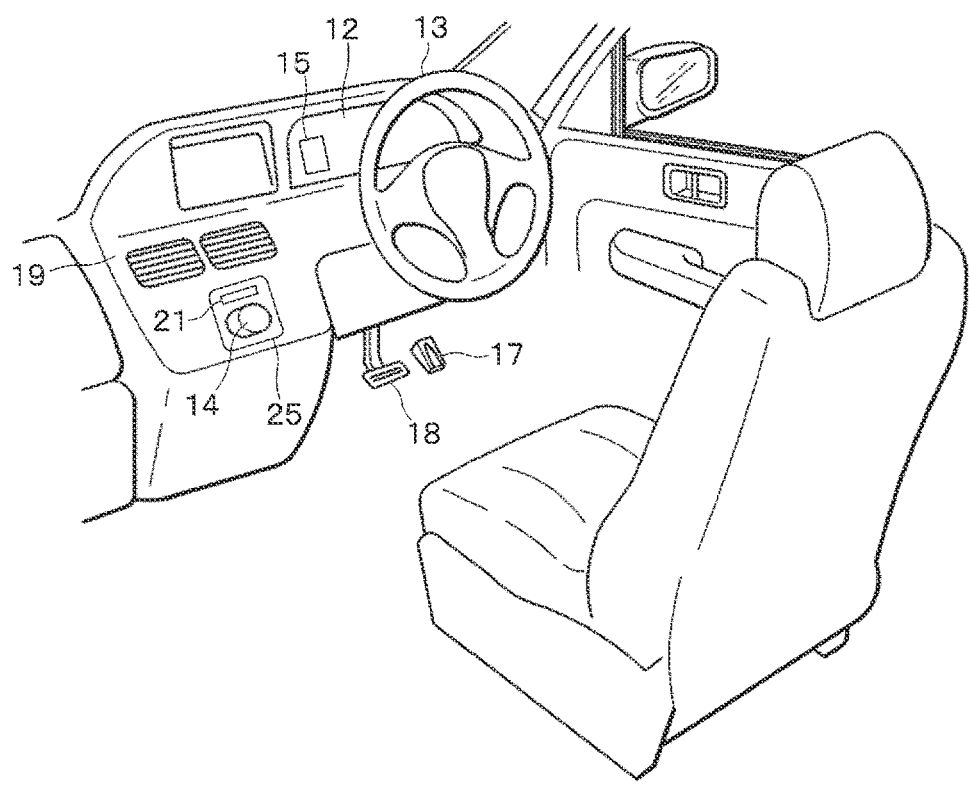
FIG. 2 is a schematic perspective view of a periphery of a driver's seat of the automobile.

FIG. 1 is a schematic diagram of a drive system of an automobile 1 according to an embodiment to which the present invention is applied. FIG. 2 is a schematic perspective view of a periphery of a driver's seat of the automobile 1.

The automobile 1 described in the present embodiment is mounted with an engine 2 as a drive source, and transmits power of the engine 2 to drive wheels through a transmission 4 and a drive shaft 5. In the illustrated example, the automobile 1 is a front-wheel drive vehicle having front wheels 6f as drive wheels, but may be a rear-wheel drive vehicle having rear wheels 6r as drive wheels or a four-wheel drive vehicle having both front and rear wheels 6 as drive wheels. In FIG. 1, reference numeral F indicates a traveling direction when the automobile 1 moves forward.

The transmission 4 mounted on the automobile 1 is an automatic transmission (AT) that automatically shifts gears under control of a control unit 11 to be described below. In the present embodiment, as an example of the transmission 4, a step AT with four forward gears and one reverse gear is described. However, the transmission 4 may be a more multi-gear AT or a continuously variable transmission (CVT). Further, a mechanical configuration of the transmission 4 may be a configuration having a torque converter or a DCT (dual clutch transmission) without being limited. The transmission 4 corresponds to an example of a shift mechanism.

The automobile 1 may be an electric automobile (EV) in which a motor generator 3 is mounted instead of the engine 2 as a drive source. In addition, the automobile 1 may be a hybrid vehicle (HEV) in which the motor generator 3 is mounted together with the engine 2 as the drive source. The motor generator 3 may function not only as an electric motor for vehicle driving but also as a regenerative braking generator. An inverter 8 functions as a regenerative braking means of controlling an electric power supply from a battery 7, which is a secondary battery, and an electric power supply (charging) to the battery 7, and converting and regenerating deceleration energy into electric power during deceleration to generate regenerative braking. The automobile 1 may be mounted with a plurality of motor generators 3. For example, the automobile 1 may be provided with a first motor generator 3 that functions as a starter motor used to start the engine 2 and a generator used to generate electricity by the power of the engine 2 and a second motor generator 3 for vehicle driving.

The automobile 1 includes a control unit 11 configured to control the drive system of the automobile 1. The control unit 11 includes, for example, a processor such as a microcomputer, a ROM (Read Only Memory), a RAM (Random Access Memory), peripheral circuits, input/output interfaces, and various drivers.

The automobile 1 includes an accelerator pedal 17 as an accelerator operation unit configured to accelerate the automobile 1 and a brake pedal 18 as a braking operation unit configured to decelerate the automobile 1. The control unit 11 is connected to a vehicle speed sensor 32 configured to detect a vehicle speed of the automobile 1, an accelerator pedal sensor 33 configured to detect the amount of operation of the accelerator pedal 17, and a brake pedal sensor 34 configured to detect an operation of the brake pedal 18.

The automobile 1 may have a configuration in which the accelerator pedal 17 is mechanically coupled to a throttle apparatus of the engine 2, and may be a vehicle that adopts a so-called drive-by-wire in which the control unit 11 controls the throttle apparatus based on the detection result of the accelerator pedal sensor 33. Further, the automobile 1 may have a configuration in which the brake pedal 18 is mechanically coupled to a braking mechanism of the automobile 1, and may be a vehicle that adopts a so-called brake-by-wire in which the control unit 11 controls the braking mechanism based on the detection result of the brake pedal sensor 34. Further, an accelerator operation unit having a lever shape or another shape may be adopted instead of the accelerator pedal 17, and a brake operation unit may be adopted instead of the brake pedal 18.

The automobile 1 includes a shift apparatus 10 including the control unit 11 as a configuration for controlling the gear shift of the transmission 4. The shift apparatus 10 includes, in addition to the control unit 11, a shift operation member 14 configured to change a shift range of the transmission 4 and an angle detector (angle detection sensor) configured to detect an operation of the shift operation member 14. In addition, the shift apparatus 10 included an electromagnetic brake mechanism 50 configured to restrict the operation of the shift operation member 14. The shift apparatus 10 may include the vehicle speed sensor 32, the accelerator pedal sensor 33, and the brake pedal sensor 34.

The automobile 1 is provided with an obstacle sensor 36. The obstacle sensor 36 is a sensor configured to detect an obstacle around the automobile 1, and includes a sonar sensor configured to detect an object within a predetermined distance from a vehicle body of the automobile 1 using ultrasonic waves, for example. The obstacle sensor 36 may be an optical sensor configured to detect an obstacle using a laser beam, or a device configured to detect an obstacle based on an image captured by a camera. The obstacle sensor 36 is connected to the control unit 11 by a control line (not shown), and outputs a detection result to the control unit 11. The shift apparatus 10 may include the obstacle sensor 36.

The control unit 11 selects a shift range of the transmission 4 according to the operation of the shift operation member 14 in addition to the drive control of the engine 2, and also performs shift control for changing a gear step of the transmission 4 according to the selected shift range. The gear step is changed by opening and closing of a shift solenoid valve (not shown) provided in a hydraulic circuit connected to the transmission 4. Further, when the automobile 1 is an electric automobile or a hybrid vehicle, the control unit 11 also controls a drive/regeneration of the motor generator 3. Further, the control unit 11 may have a function of controlling a lighting device mounted on the automobile 1 or another function of the automobile 1. A function related to the control of the transmission 4 will be described below.

The shift operation member 14 is a dial-shaped columnar knob, and an operation of rotating the shift operation member 14 is performed by the hand of the driver who drives the automobile 1. The driver can rotate the shift operation member 14 to switch a gear shift mode of the transmission 4 of the automobile 1, that is, the shift range. The shift operation member 14 corresponds to an example of an operation member.

The shift range of the automobile 1 includes a P (parking) range selected during parking of the automobile 1, an R (reverse) range used to retreat the automobile 1, an N (neutral) range which is a state where a driving force is not transmitted from the transmission 4 to the drive shaft 5, and a D (drive) range used to move forward the automobile 1. The transmission 4 may be configured to restrict the rotation of the drive shaft 5 in the P range and not to apply either of the driving force or the braking force to the drive shaft 5 in the N range. Further, the automobile 1 includes one or a plurality of forward shift ranges different from the D range. These types of shift ranges are called a S range, an L range, a D2 range, and a B range, and the transmission 4 of the present embodiment includes an S range as an example. In such a shift range, a deceleration ratio of the drive shaft 5 to the drive shaft of the engine 2 or the motor generator 3 is larger than that in D range. For example, such a shift range is selected for the purpose of giving a drive torque larger than that in the D range to the drive shaft 5 or for the purpose of generating a braking force stronger than that in the D range on the drive shaft 5 by engine braking or regeneration.

The transmission 4 includes a parking lock portion 70. The parking lock portion 70 operates when the shift range is the P range, and includes a parking lock mechanism configured to lock an output shaft coupled to the drive shaft 5. The parking lock portion 70 operates an actuator 72 (which will be described below) according to the control of the control unit 11, thereby switching the transmission 4 from a locked state to an unlocked state. The parking lock portion 70 corresponds to an example of a shift lock portion.

The shift operation member 14 is provided on a lower left side of a steering wheel 13 in the instrument panel 19 of the automobile 1. In the instrument panel 19, a portion provided with the shift operation member 14 may protrude as compared with other portions such that the driver can easily operate the shift operation member 14. A position of the shift operation member 14 is not limited to the example of FIG. 2, and may be provided at a center console or at another position.

The shift operation member 14 is unitized together with a display panel 21 configured to display the shift range selected in the automobile 1 to form an operation unit 25.

In addition, a display 15 is arranged on a meter panel 12. The shift range selected in the transmission 4 is displayed on the display 15. The display 15 corresponds to an example of a display portion.

2. Configuration of Operation Unit

Figure 3:
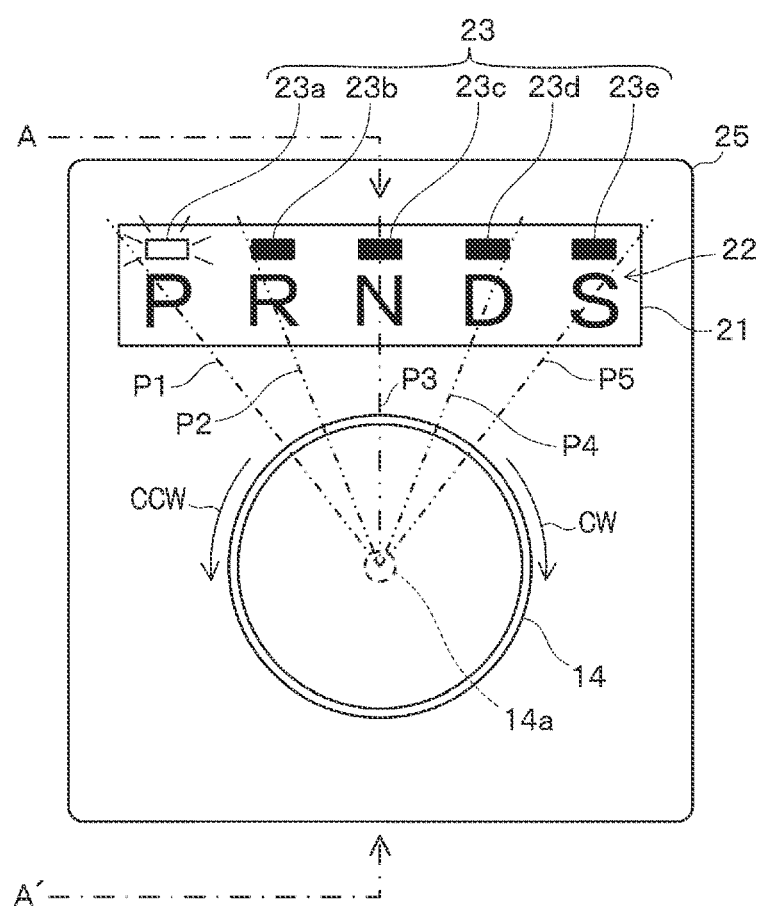
FIG. 3 is a plan view of an operation unit.

FIG. 3 is a plan view of the operation unit 25.

As shown in FIG. 3, the shift operation member 14 can rotate in a clockwise direction (CW in the drawing) and a counterclockwise direction (CCW in the drawing). In the operation unit 25, the display panel 21 is arranged above the shift operation member 14. On the display panel 21, displays of P, R, N, D, and S, which are the shift ranges of the transmission 4, are sequentially arranged in this order in the CW direction which is a rotation direction of the shift operation member 14.

The driver rotates the shift operation member 14 in the CW direction or the CCW direction to select the shift range of the transmission 4.

On the display panel 21, an indicator 23 is located corresponding to the displays of P, R, N, D, and S of a range display portion 22. The indicator 23 includes indicators 23a, 23b, 23c, 23d, and 23e corresponding to the positions of P, R, N, D, and S of the range display portion 22, respectively. The indicator 23a includes a light source such as an LED, and emits light in a state where the P range is selected as the shift range of the transmission 4. Similarly, each of the indicators 23b, 23c, 23d, and 23e includes a light source such as an LED. The indicator 23b emits light in a state where the R range is selected as the shift range of the transmission 4. The indicator 23c emits light in a state where the N range is selected, the indicator 23d emits light in a state where the D range is selected, and the indicator 23e emits light in a state where the S range is selected. FIG. 3 shows, as an example, a state where the P range is selected and the indicator 23a is emitting light.

In the rotation direction of the shift operation member 14, selection positions P1, P2, P3, P4, and P5 are set corresponding to the number of shift ranges of the transmission 4. The shift operation member 14 can rotate infinitely in the CW direction and the CCW direction, and is configured to obtain feeling of moderation (click feeling) at a constant angle interval as will be described below. More specifically, a click feeling is obtained for each of the angles corresponding to the selection positions P1, P2, P3, P4, and P5. For example, when the shift operation member 14 is rotated in the CW direction in the state where the shift range P is selected, a click feeling can be obtained at the selection positions P2, P3, P4, and P5. Further, when the shift operation member 14 is rotated in the CCW direction in the state where the shift range S is selected, a click feeling can be obtained at the selection positions P4, P3, P3, and P2. Thus, the shift operation member 14 can be easily rotated step by step corresponding to the displays of P, R, N, D, and S of the range display portion 22, and the operability of the operation of selecting the shift range is improved.

A relative position between the shift operation member 14 and each of the selection positions P1 to P5 is not fixed. The shift operation member 14 can be rotated in the CCW direction from the selection position P1, and can be rotated in the CW direction from the selection position P5. In this case, the selected shift range is the P range or the S range, and is not changed.

FIG. 3 shows an example of the configuration, and the automobile 1 may have a configuration in which the shift range of the transmission 4 can be selected from six steps of P, R, N, D, S, and L. Further, the automobile 1 may have a configuration in which the S range or the L range is not provided. In such a case, the number of indicators 23 and the number of selection positions may be appropriately changed according to the number of shift ranges selected by the operation of the shift operation member 14. In addition, the arrangement of the shift ranges in the range display portion 22 is not limited to the example of FIG. 3. For example, the displays of the shift ranges can be arranged clockwise instead of counterclockwise, and the B range can be arranged instead of the L range.

Figure 4:
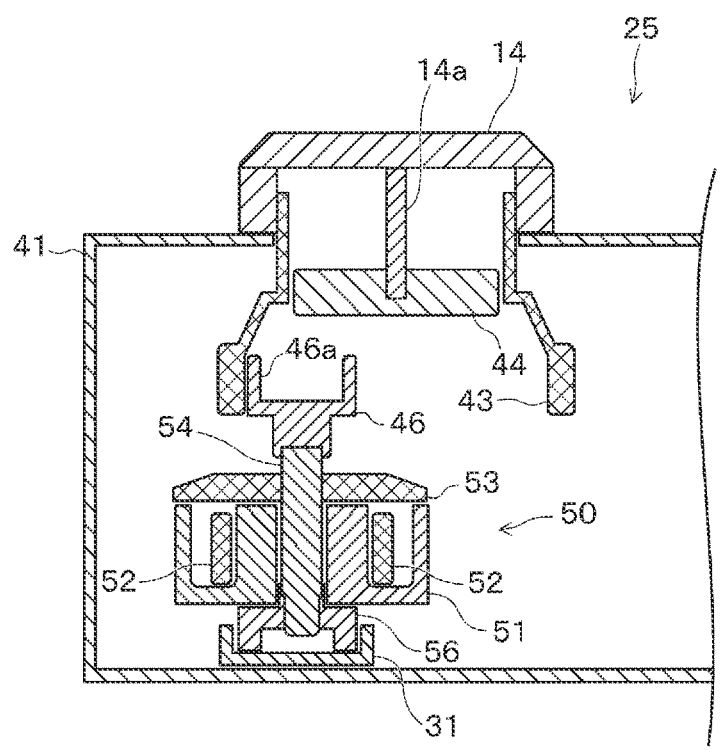
FIG. 4 is a cross-sectional view of a main portion of the operation unit.

FIG. 4 is a cross-sectional view of a main portion of the operation unit 25, and shows a main portion of the cross section A-A' in FIG. 3.

The shift operation member 14 is arranged on an upper surface of a case 41 of the operation unit 25. The case 41 houses an operation load generator 44, an overdrive mechanism 46, an electromagnetic brake mechanism 50, and an angle detector 31.

The shift operation member 14 includes a shaft 14a which is a rotating center, and the shaft 14a is supported by the operation load generator 44. The operation load generator 44 includes, for example, cams formed at predetermined angles in the rotation direction of the shift operation member 14 and rollers that slide with the cams. The operation load generator 44 rotatably supports the shaft 14a, and generates resistance to the rotation of the shaft 14a at each angle corresponding to the cam position in the rotation direction of the shaft 14a. Thus, a click feeling is generated for the operation of rotating the shift operation member 14.

When the rotating amount of the shift operation member 14 is less than the minimum operation angle, the rollers move in a reverse direction along the cams, and thus the operation load generator 44 has an operation of returning the shift operation member 14 to the position before rotation. Therefore, when the rotating amount of the shift operation member 14 to be rotated by the driver is small, the shift operation member 14 returns to the position before rotation, so that, for example, it is possible to prevent the driver from unintentionally switching the shift range. The minimum operation angle is half of the predetermined angle, for example.

A gear 43 is fixed to the shift operation member 14. The gear 43 rotates around the shaft 14a together with the shift operation member 14.

The overdrive mechanism 46 includes a small-diameter gear 46a that engages with the gear 43, and is connected to a shaft 54. The overdrive mechanism 46 increases a rotational speed of the gear 43 with an overdrive ratio according to a ratio between the number of teeth of the gear 43 and the number of teeth of the gear 46a and transmits the rotational speed to the shaft 54.

The electromagnetic brake mechanism 50 is an example of a regulation mechanism that regulates the rotation of the shift operation member 14, and forms a regulation unit together with an operation control section 114 to be described below. The electromagnetic brake mechanism 50 includes a cylindrical yoke 51, a coil 52 arranged inside the yoke 51, and an armature 53. The coil 52 is connected to the control unit 11, and a current application to the coil 52 is switched to be ON and OFF by the control of the control unit 11.

The armature 53 is coupled to a lower part of the shaft 54 and is rotatable with the shaft 54.

In a state where the current is not applied to the coil 52, the armature 53 is rotatably supported together with the shaft 54. In such a state, the armature 53 rotates as the shift operation member 14 rotates.

When the current is applied to the coil 52, the yoke 51 is magnetized, and the rotation of the armature 53 is regulated by a magnetic force of the yoke 51. Therefore, the rotation of the shaft 54 is regulated, and the rotation of the shift operation member 14 is prevented. In other words, the shift operation member 14 is locked so as not to rotate. When the current application to the coil 52 is turned off, the lock of the shift operation member 14 is released.

A to-be-detected object 56 is coupled to a lower end of the shaft 54. The to-be-detected object 56 is located inside the angle detector 31, and rotates together with the overdrive mechanism 46 and the shaft 54. The angle detector 31 is a sensor configured to detect a rotating amount of the to-be-detected object 56, and corresponds to an example of a position detection unit. The angle detector 31 outputs a detection result of the rotating amount of the to-be-detected object 56 to the control unit 11. The control unit 11 can detect a rotation angle of the shift operation member 14 by performing an arithmetic operation based on the detection result of the angle detector 31 and the overdrive ratio of the overdrive mechanism 46.

The electromagnetic brake mechanism 50 electromagnetically regulates the rotation of the armature 53. For this reason, the current flowing through the coil 52 can be adjusted, and thus a slight rotation of the armature 53 can be allowed during the current application to the coil 52. In this case, when the driver applies an operating force in the CW direction or the CCW direction to the shift operation member 14 during the current application to the coil 52, the shift operation member 14 slightly rotates due to the operating force. When such an operating force is released, the shift operation member 14 is returned to the position before rotation due to the action of the operation load generator 44.

When the operating force is applied to the shift operation member 14 during the current application to the coil 52 and when the operating force is released, the movement of the shift operation member 14 can be detected by the angle detector 31. Therefore, the control unit 11 can detect, based on the detection result of the angle detector 31, the application of the operating force to the shift operation member 14 while the rotation of the electromagnetic brake mechanism 50 is regulated and the release of the operating force.

The configuration shown in FIG. 4 is an example. For example, the operation load generator 44 may employ a known detent mechanism. Further, the angle detector 31 may be configured to magnetically detect the rotating amount of the to-be-detected object 56 rotating amount, or may be configured to detect using an optical sensor, and other detection methods may be employed. In addition, the operating force applied to the shift operation member 14 while the electromagnetic brake mechanism 50 regulates the rotation of the shift operation member 14 may be detected using, for example, a piezoelectric element, or may be detected by other sensors.

3. Operation Position of Shift Operation Member

Figure 5:
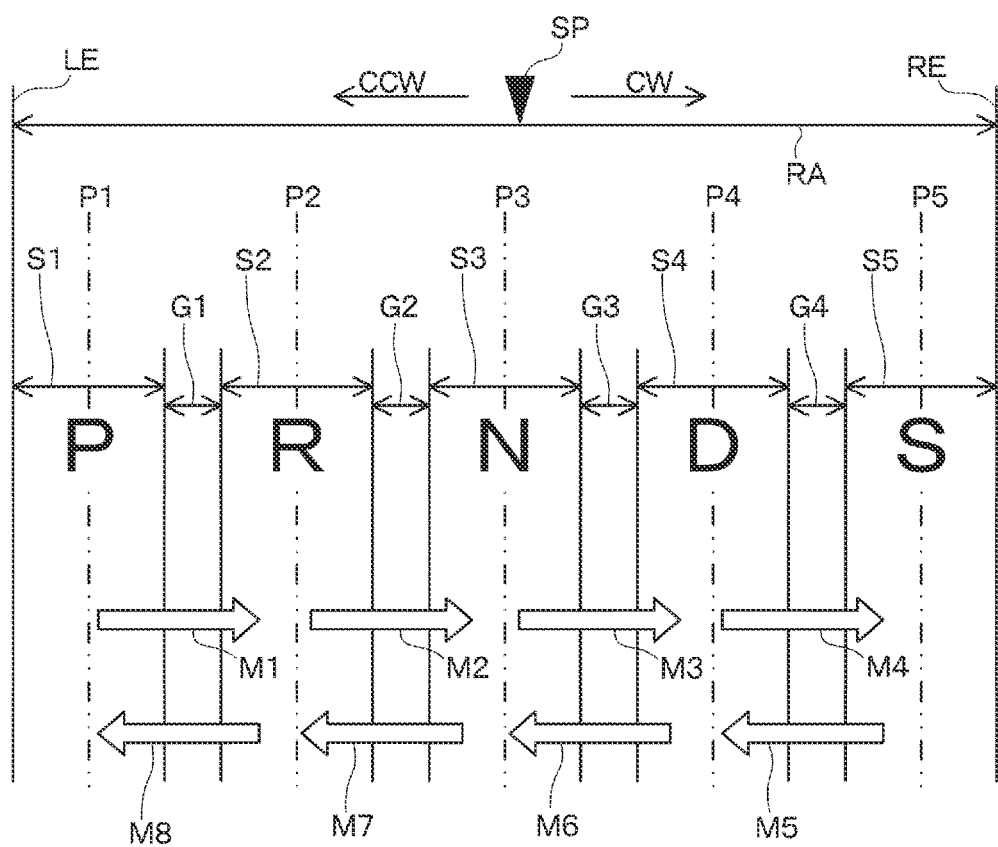
FIG. 5 is an explanatory diagram showing movement of an operation position.

FIG. 5 is an explanatory diagram showing an outline of movement of the operation position.

In FIG. 5, an operable range of the shift operation member 14 is indicated by an operation range RA, and an operation position to be moved by a reflection of the operation of the shift operation member 14 is indicated by a reference numeral SP. The operation range RA indicates the rotation range in which the shift operation member 14 can rotate, as a movement range of the operation position SP.

The operation position SP is a virtual position set by the control unit 11 in association with the shift operation member 14. The control unit 11 moves the operation position SP according to a direction in which the shift operation member 14 is operated and the amount of operation. In other words, the operation position SP is moved in the CW direction and the CCW direction in the operation range RA with the rotation of the shift operation member 14 in the CW direction and the CCW direction. In FIG. 5, a rotating angle of the shift operation member 14 is replaced with a position in a horizontal direction, the CW direction corresponds to a right direction in the drawing, and the CCW direction corresponds to a left direction.

The selection positions P1, P2, P3, P4, and P5 are arranged side by side in the operation range RA. In the operation range RA, a range S1 including the selection position P1, a range S2 including the selection position P2, a range S3 including the selection position P3, a range S4 including the selection position P4, and a range S5 including the selection position P5 are set. When the position of the operation position SP is included in the ranges S1, S2, S3, S4, and S5, the control unit 11 sets the shift range to the P range, the R range, the N range, the D range, and the S range. For example, when the operation position SP moves in the CW direction from the selection position P1 and reaches the range S2, the control unit 11 changes the selected shift range from the P range to the R range.

The control unit 11 can change the setting related to the correspondence between the shift operation member 14 and the operation position SP.

When the rotation of the shift operation member 14 is stopped, the control unit 11 resets the position of the operation position SP so as to be in a center of the range S to which the operation position SP at the time of stop belongs. For example, when the operation position SP stops in the range S1, the control unit 11 moves the operation position SP to the selection position P1 which is the center of the range S1. Thereafter, when the shift operation member 14 is operated, the operation position SP is moved from the selection position P1 as a starting point.

Intermediate ranges G1, G2, G3, and G4 are ranges in which the control unit 11 does not determine the shift range. When the operation position SP moves beyond the intermediate ranges G1, G2, G3, and G4, the control unit 11 switches the shift range. The selection positions P1, P2, P3, P4, and P5 correspond to predetermined angles at which the operation load generator 44 changes the operation load of the shift operation member 14. Therefore, the operation position SP easily stops at a position included in any of the ranges S1 to S5, and is difficult to stop at the intermediate ranges G1, G2, G3, and G4.

The shift operation member 14 can freely rotate, and can move the operation position SP in the CCW direction from a left end LE or move the operation position SP in the CW direction from a right end RE. The control unit 11 stops the operation position SP at the left end LE when the shift operation member 14 rotates in the CCW direction after the operation position SP reaches the left end LE of the operation range RA. Similarly, the control unit 11 stops the operation position SP at the right end RE when the shift operation member 14 rotates in the CW direction after the operation position SP reaches the right end RE of the operation range RA. Thereafter, when the shift operation member 14 is stopped, the control unit 11 resets the operation position SP to the selection position P1 or the selection position P5. Further, the control unit 11 may operate the electromagnetic brake mechanism 50 to limit the rotation of the shift operation member 14 such that the operation position SP does not exceed the range corresponding to the left end LE and the right end RE.

In the present embodiment, shift operations M1, M2, M3, M4, M5, M7, and M8 indicate operations in which the driver switches the shift range with the shift operation member 14, and are shown by arrows in FIG. 5. The shift operations M1 to M4 are shift operations in the CW direction. For example, the shift operation M1 is an operation from the P range to the R range, and the shift operation M2 is an operation from the R range to the N range. The shift operations M5 to M8 are shift operations in the CCW direction. For example, the shift operation M7 is an operation from the N range to the R range, and the shift operation M8 is an operation from the R range to the D range.

The control unit 11 can generate a reaction force in the shift operations M1 to M8 by allowing the electromagnetic brake mechanism 50 to operate, and can prevent or restrict the switching of the shift range. In the present embodiment, the control unit 11 restricts the rotation of the shift operation member 14 with the electromagnetic brake mechanism 50 when the shift operation M1 is performed in a state where the brake pedal 18 is not operated. In this case, when the brake pedal 18 is operated in a state where the shift operation member 14 is not operated, the control unit 11 releases the restriction by the electromagnetic brake mechanism 50. Similarly, the control unit 11 may impose restrictions on the shift operations M2 and M7.

4. Display on Meter Panel

Figure 6:
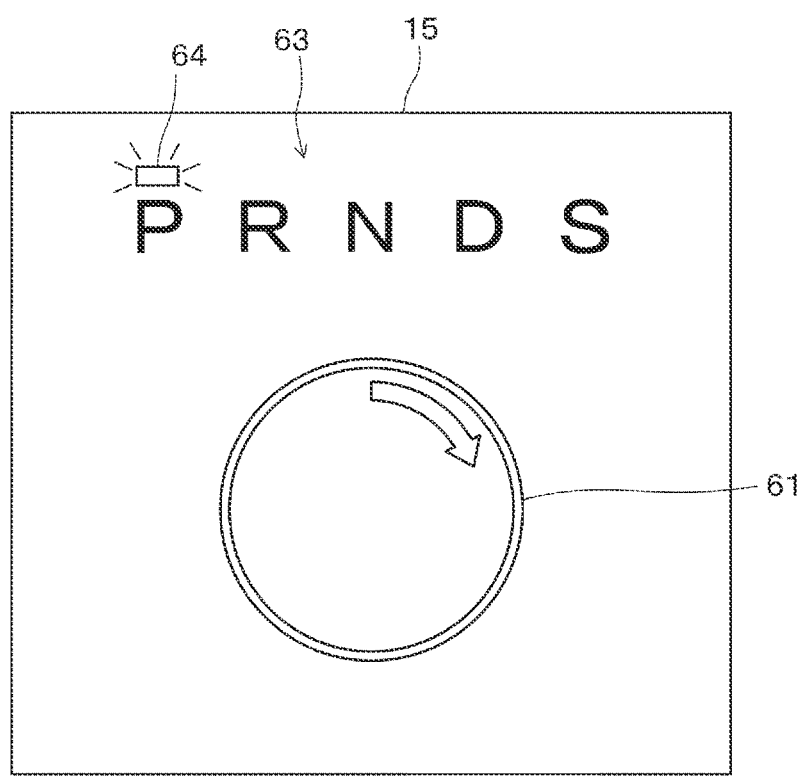
FIG. 6 is a diagram showing a display example of a display.

FIG. 6 is a diagram showing a display example of the display 15 provided on the meter panel 12.

The display 15 executes a display in imitation of the operation unit 25, for example, under the control of the control unit 11.

On the display 15, a dial image 61, a shift range display portion 63, and a shift indicator 64 are displayed. The dial image 61 is an image in imitation of the shift operation member 14. The shift range display portion 63 is an image showing the shift ranges that can be selected by the shift operation member 14 and arranged side by side. The shift indicator 64 is an image indicating a shift range currently selected from the shift ranges displayed on the shift range display portion 63. The shift indicator 64 may be an LED indicator attached to the display, or may be an image in imitation of the LED indicator.

The driver can confirm the selected shift range by the display of the display 15 installed on the meter panel 12. Therefore, the driver can visually check the result of the operation from the display 15 when operating the shift operation member 14.

A mode of displaying the shift ranges on the display 15 is not limited to the example of FIG. 6. For example, instead of the shift range display portion 63 and the shift indicator 64, only the characters indicating the selected shift range may be displayed on the center of the display 15.

5. Configuration of Control Unit

Figure 7:
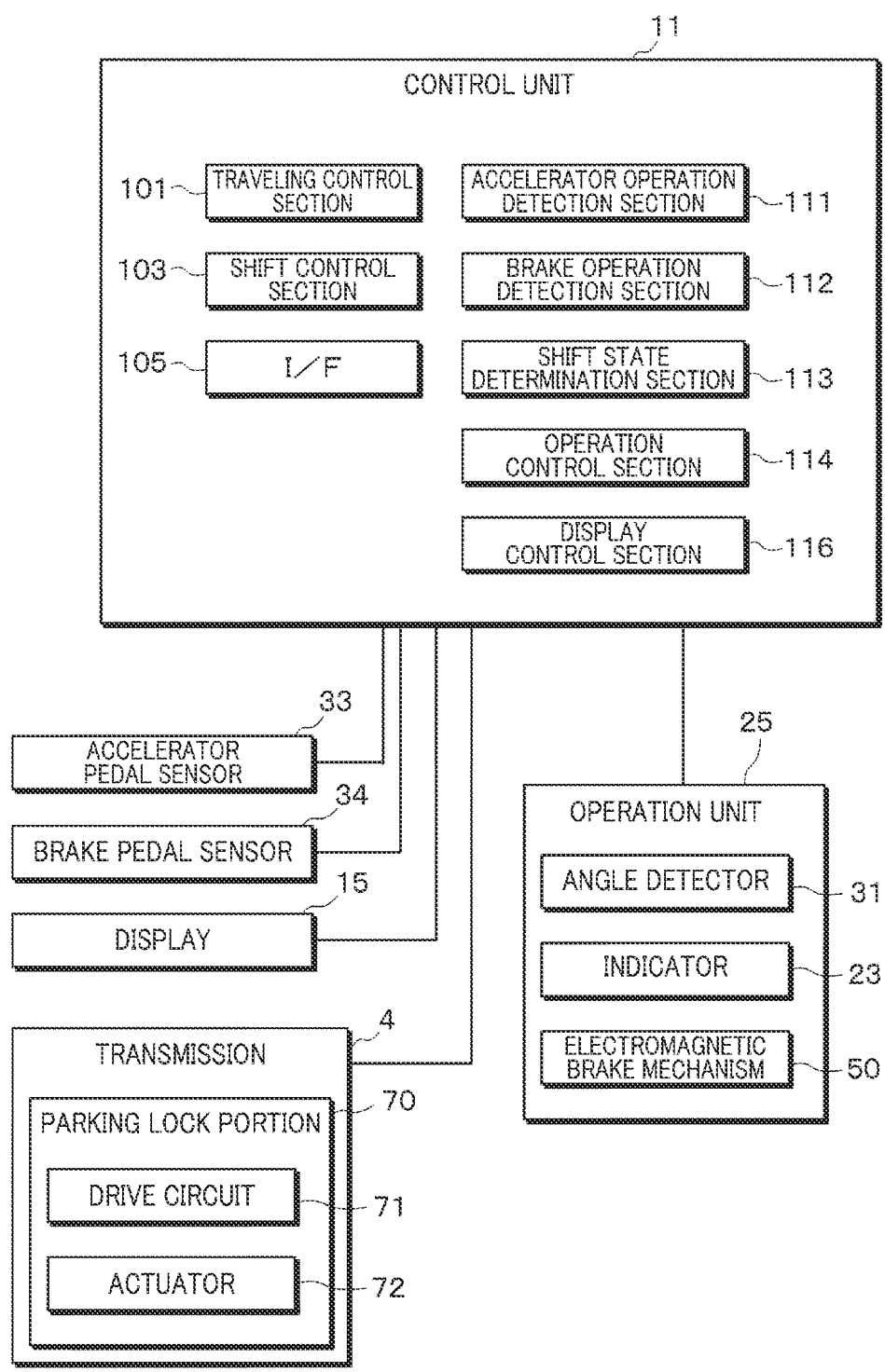
FIG. 7 is a block diagram of a control system of the automobile.

FIG. 7 is a block diagram of a control system of the automobile 1.

The control unit 11 has a so-called ECU (Electronic Control Unit) function, and controls respective units of the automobile 1. The control unit 11 includes, for example, a processor such as a CPU (Central Processing Unit) or a microcomputer, and executes a program by the processor to control respective units of the automobile 1. The control unit 11 may include control hardware configured by an FPGA (Field-programmable Gate Array) and an ASIC (Application Specific Integrated Circuit).

The control unit 11 includes, as functional units configured by the program and hardware described above, a traveling control section 101, a shift control section 103, and an interface 105. Further, the control unit 11 includes an accelerator operation detection section 111, a brake operation detection section 112, a shift state determination section 113, an operation control section 114, and a display control section 116.

The traveling control section 101 controls, based on the detection results of the accelerator pedal sensor 33 and the brake pedal sensor 34, the engine 2 and the inverter 8 to cause the automobile 1 to travel.

The shift control section 103 detects the operation of the shift operation member 14 to select the shift range of the transmission 4 corresponding to the operation of the driver. The shift control section 103 outputs a control signal instructing to switch to the selected shift range to the transmission 4, and thus switches the shift range of the transmission 4.

Specifically, the shift control section 103 determines, based on the detection result of the angle detector 31, which of the ranges S1 to S5 the position of the shift operation member 14 corresponds to, and switches the shift range according to the determined range. In this case, the shift control section 103 executes the switching of the shift range of the transmission 4 and switches the indicator 23 to be turned on in the indicator 23.

The interface 105 is a circuit configured to exchange various signals and data with an external device of the control unit 11, and is connected to at least the display 15, the brake pedal sensor 34, the transmission 4, and the operation unit 25. The accelerator pedal sensor 33 and the obstacle sensor 36 may be connected to the interface 105. As shown in FIG. 1, the control unit 11 is connected to the engine 2 and the inverter 8, but is not shown in FIG. 7 for convenience of description.

The parking lock portion 70 of the transmission 4 includes a drive circuit 71 and an actuator 72. The parking lock portion 70 includes the parking lock mechanism that locks the output shaft coupled to the drive shaft 5, as described above. The actuator 72 moves the parking lock mechanism to switch between a state of being fitted to the output shaft of the transmission 4 and a state of being disconnected from the output shaft.

The drive circuit 71 includes a circuit configured to supply a drive current to the actuator 72 and a circuit configured to switch ON/OFF of the drive current. The drive circuit 71 drives the actuator 72 under the control of the control unit 11, and switches from a state where the output shaft is locked to a state where the lock is released. In addition, the drive circuit 71 detects a temperature of the actuator 72 and/or a temperature of the parking lock mechanism. For example, the drive circuit 71 includes a temperature sensor (not shown) arranged in the vicinity of the actuator 72, and monitors a temperature detected by the temperature sensor.

The temperature of the actuator 72 rises depending on the operating state of the actuator 72. When the actuator 72 performs a frequent operation in a short time, the temperature of the actuator 72 may rise beyond the set temperature range. In such a case, the drive circuit 71 performs protection control for protecting the actuator 72. The protection control is, for example, an operation in which the drive circuit 71 temporarily stops the operation of the actuator 72. In such a case, the drive circuit 71 completes the operation being executed by the actuator 72, and does not operate the actuator 72 until the temperature reaches the temperature within the set temperature range after the operation is completed.

When executing the protection control of the actuator 72, the drive circuit 71 outputs a control signal indicating the execution of the protection control to the control unit 11. The drive circuit 71 may output a value detected by the temperature sensor to the control unit 11. In addition, the drive circuit 71 may output a control signal to the control unit 11 when detecting that the value detected by the temperature sensor exceeds the set temperature range.

Further, the drive circuit 71 is not limited to a configuration in which the temperature is directly detected using the temperature sensor. For example, the drive circuit 71 or the shift state determination section 113 may estimate, based on the operating state of the actuator 72, whether the temperature of the actuator 72 exceeds the set temperature range. In this case, the drive circuit 71 may start the protection control when estimating that the temperature of the actuator exceeds the set temperature range.

The accelerator operation detection section 111 detects, based on the detection result of the accelerator pedal sensor 33, the presence or absence of the operation of the accelerator pedal 17 and/or the amount of operation of the accelerator pedal 17.

The brake operation detection section 112 detects, based on the detection result of the brake pedal sensor 34, the presence or absence of the operation of the brake pedal 18 and/or the amount of operation of the brake pedal 18. The brake operation detection section 112 corresponds to an example of a braking operation detection unit.

The shift state determination section 113 determines whether the parking lock portion 70 is in a shift restriction state. The shift restriction state refers to a state where the parking lock portion 70 has a hindrance in performing and releasing a parking lock. Specifically, an example of the shift restriction state is a state where the drive circuit 71 executes the protection control of the actuator 72.

Further, the shift state determination section 113 may determine to be in the shift restriction state when the parking lock is not enabled within a set time after the shift state determination section 113 instructs the drive circuit 71 to enable the parking lock. In this case, the shift state determination section 113 may allow the drive circuit 71 to detect the operating position and the operating state of the actuator 72 and may determine whether the parking lock is enabled in the transmission 4.

In addition, the shift restriction state may include, for example, a state where a power supply voltage supplied to the parking lock portion 70 is low and the operation of the parking lock portion 70 is hindered. Specifically, there are cases where the output voltage of the battery 7 is lower than a voltage sufficient for driving the actuator 72 and where the operation of the control unit 11 can be hindered due to the insufficient output voltage of the battery 7. The shift state determination section 113 may have, for example, a function of monitoring the output voltage of the battery 7. Further, the shift state determination section 113 may have a function of monitoring the state of the signal output to the control unit 11 from the operation unit 25. In this case, the shift restriction state includes a case where the state of the output signal from the operation unit 25 is not appropriate.

The operation control section 114 controls the regulation of the shift operation member 14 by the electromagnetic brake mechanism 50. Specifically, the operation control section 114 performs control such that the current application to the coil 52 is switched to be ON and OFF, and switches from a state where the electromagnetic brake mechanism 50 locks the shift operation member 14 to a state where the lock is released. The operation control section 114 locks the electromagnetic brake mechanism 50 to regulate the rotation of the shift operation member 14, for example, when it is notified that the shift control section 103 switches the shift range to the P range.

Among the shift range switching operations of the automobile 1, there is a restriction on the operation of changing from a certain of the shift range to another shift range. For example, in order to perform an operation of changing from the P range to the shift range other than the P range, the brake pedal 18 needs to be operated. This is a restriction for preventing for the driver from unintentionally operating the automobile 1, and is a restriction generally provided in the automobile.

Also in the shift apparatus 10 of the present embodiment, the shift operation member 14 can be operated in the state where the P range is selected, on condition that the brake pedal 18 is operated in a state where the shift operation member 14 is not operated. When the shift range selected by the shift control section 103 is the P range and the shift operation member 14 is rotated in the CW direction without the operation of the brake pedal 18, the operation control section 114 operates the electromagnetic brake mechanism 50 to lock the shift operation member 14. In this case, when the brake pedal 18 is operated after the shift operation member 14 is not operated, the operation control section 114 releases the lock.

The display control section 116 drives the display 15, and allows the display 15 to display the shift range selected by the shift control section 103.

In the automobile 1 that employs the shift operation member 14, the driver can quickly perform the shift operation. For this reason, the shift operation member 14 can be operated while the control unit 11 controls the transmission 4 and the electromagnetic brake mechanism 50 to operate.

As an example, it is assumed that the operation position SP shown in FIG. 5 moves from the selection position P2 to the range S1, and the control unit 11 controls the transmission 4 and the electromagnetic brake mechanism 50 in response to such an operation. The shift control section 103 controls the transmission 4 to switch the shift range to the P range, using the fact that the operation position SP reaches the range S1, as a trigger. Further, the shift control section 103 controls the drive circuit 71 to operate the actuator 72, and locks the output shaft of the transmission 4. Using the fact that the shift control section 103 selects the P range, as a trigger, the operation control section 114 locks the shift operation member 14 by the electromagnetic brake mechanism 50. Thus, the shift operation member 14 can hardly be rotated in the state where the brake pedal 18 is not operated.

In this example, when the driver quickly rotates the shift operation member 14 in the CW direction after the shift operation member 14 reaches the range S1, the lock by the electromagnetic brake mechanism 50 is not in time, and the shift operation member 14 may rotate. This is a phenomenon caused by a signal transmission delay between the control unit 11, the angle detector 31, and the electromagnetic brake mechanism 50, and by a processing speed of the control unit 11. Even when the signal transmission delay and the processing speed are within the range where there is no practical problem, there is no denying the possibility that such a phenomenon occurs when the driver quickly operates the shift operation member 14 in an extremely short time.

When the operation position SP reaches the range S2, the shift control section 103 selects the R range as the shift range. Thus, the operation control section 114 releases the lock of the shift operation member 14 by the electromagnetic brake mechanism 50, and transitions to a state corresponding to the R range. Further, the shift control section 103 controls the drive circuit 71 to release the parking lock of the parking lock portion 70. Therefore, it is not necessary to control the operation of the actuator 72 to be switched in a short time. It cannot be said that such control is appropriately executed when the parking lock portion 70 is in the shift restriction state.

On the other hand, when the driver switches to the R range in a short time after selecting the P range, it is considered that the driver intends to switch to the R range. Therefore, there is a certain usefulness in switching the shift range in response to a quick operation according to the driver's intension.

Accordingly, in the present embodiment, the shift control section 103 permits the operation of shift operation member 14 when the operation position SP reaches the range S1 and then moves to the range S2 in a short time. The shift operation from the P range to the R range is not permitted unless the brake pedal 18 is operated, but such operation is permitted when the control for locking the shift operation member 14 may not be in time. Therefore, the shift control section 103 switches the shift range to the R range in response to the rotation of the shift operation member 14. Further, the operation control section 114 does not perform the restriction by the electromagnetic brake mechanism 50.

Further, the shift control section 103 does not permit a quick operation of the shift operation member 14 when the shift state determination section 113 detects the shift restriction state. In this case, the shift control section 103 does not perform the switching to the R range, and resets the position of the operation position SP corresponding to the shift operation member 14. The operation control section 114 executes the lock by the electromagnetic brake mechanism 50. As a result, the automobile 1 is in a state where the P range is selected, and the operation of quickly rotating the shift operation member 14 in the CW direction is canceled. According to such an operation, since the parking lock portion 70 is not operated in the shift restriction state, the respective portions of the automobile 1 can be protected. Moreover, since the P range is maintained, there is no safety concern.

The details of the above-described operation will be described with reference to a flowchart and a timing chart.

6. Operation of Shift Apparatus

Figure 8:
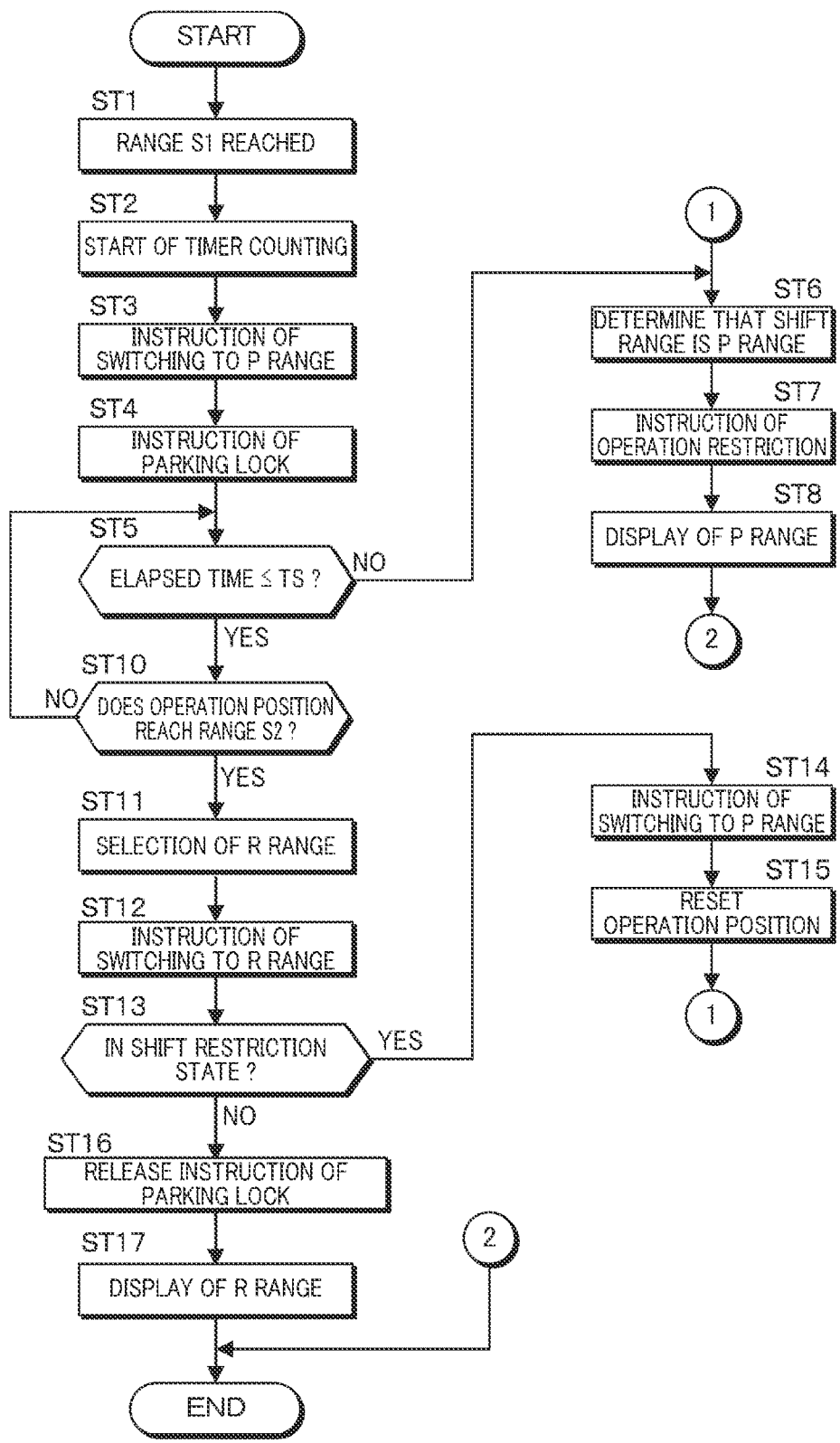
FIG. 8 is a flowchart showing an operation of the shift apparatus.

An operation of the shift apparatus 10 will be described with reference to a flowchart. FIG. 8 is a flowchart showing the operation of the shift apparatus 10. The operation of FIG. 8 is executed by the control unit 11. Specifically, the shift control section 103 executes operations of steps ST1 to ST6, ST10 to ST14, and ST16, the operation control section 114 executes step ST7, and the display control section 116 executes steps ST8 and ST17.

When detecting that the shift operation member 14 reaches the range S1 (step ST1), the shift control section 103 starts counting with a timer (step ST2). The shift control section 103 outputs a control signal to the transmission 4 to switch the shift range to the P range (step ST5). In addition, the shift control section 103 outputs a control signal to the drive circuit 71 to enable the parking lock of the parking lock portion 70 (step ST4). The execution order of steps ST2, ST3, and ST4 can be changed as appropriate, and may be executed in parallel.

The shift control section 103 determines whether an elapsed time during counting is equal to or shorter than a preset time TS (step ST5). In step ST5, when the elapsed time exceeds the time TS (NO in step ST5), the shift control section 103 determines that the shift range is the P range (step ST6). In step ST6, the shift control section 103 determines that the shift range selected by the operation of the shift operation member 14 is the P range, and notifies the operation control section 114 and the display control section 116 that the P range is selected. Step ST6 is executed when the operation position SP remains in the range S1 until the elapsed time reaches the time TS.

The operation control section 114 enables the operation restriction of the shift operation member 14 by the electromagnetic brake mechanism 50 (step ST7). The display control section 116 allows the display 15 to display that the selected shift range is the P range (step ST8). Prior to the process of step ST8, the display control section 116 may maintain the display of the display 15 as the display of the shift range previously selected, or may temporarily hide the display in step ST1.

In step ST5, when the elapsed time does not exceed the time TS (YES in step ST5), the shift control section 103 determines whether the operation position SP reaches the range S2 (step ST10). Here, when the operation position SP does not reach the range S2 (NO in step ST10), the shift control section 103 returns to step ST5.

When the operation position SP reaches the range S2 (YES in step ST10), it is determined that the R range is selected (step ST11). The shift control section 103 outputs a control signal to the transmission 4 to switch the shift range to the R range (step ST12).

Here, the shift control section 103 determines whether to be in the shift restriction state with reference to the determination result of the shift state determination section 113 (step ST13).

In the case of being in the shift restriction state (YES in step ST13), the shift control section 103 outputs a control signal, which instructs the switching to the P range, to the transmission 4, thereby canceling the switching to the R range (step ST14). Further, the shift control section 103 resets the operation position SP to the selection position P1 corresponding to the P range (step ST15), and the process proceeds to step ST6.

In the case of not being in the shift restriction state (NO in step ST13), the shift control section 103 outputs a control signal to the drive circuit 71 to release the parking lock of the parking lock portion 70 (step ST16). The shift control section 103 notifies the operation control section 114 and the display control section 116 that the R range is selected. The display control section 116 allows the display 15 to display that the selected shift range is the R range (step ST17). Prior to the process of step ST17, the display control section 116 may maintain the display of the display 15 as the display of the shift range previously selected, or may temporarily hide the display in step ST1. The execution order of steps ST7 and ST8 can be changed as appropriate, and may be executed in parallel. The same applies to the execution order of steps ST14 and ST15. The same applies to the execution order of steps ST16 and ST17.

FIGS. 9A to 9H are timing charts showing an operation example of the shift apparatus 10. In FIGS. 9A to 9H, FIG. 9A shows a shift range corresponding to the operation position SP, and FIG. 9B shows a shift range instructed by the shift control section 103 to the transmission 4. FIG. 9C shows an execution state of the process in which the shift control section 103 resets the operation position SP. FIG. 9D shows an operation restriction state instructed by the operation control section 114 to the electromagnetic brake mechanism 50, and FIG. 9E shows a state where an operation is restricted by the electromagnetic brake mechanism 50. FIG. 9F shows an instruction state of the parking lock from the shift control section 103 to the drive circuit 71, and FIG. 9G shows a control signal output by the drive circuit 71. FIG. 9H shows an operating state of the actuator 72.

FIGS. 9A to 9H show an operation example after the operation position SP reaches the range S1 from the range S2 by the operation of the shift operation member 14. In this example, as shown in FIG. 9A, the operation position SP reaches the range S1 at time T1, and then the operation position SP reaches the range S2 at time T2. This corresponds to the operation of rotating the shift operation member 14 in the CW direction from time T1 to time T2.

As shown in FIG. 9B, the shift control section 103 detects that the operation position SP reaches the range S1 at time T1, and instructs the transmission 4 to switch the shift range to the P range. Thus, as shown in FIG. 9F, the shift control section 103 instructs the drive circuit 71 to enable the parking lock. The drive circuit 71 drives the actuator 72, and the actuator 72 starts operating as shown in FIG. 9H.

As shown in FIG. 9D, the operation control section 114 does not control the electromagnetic brake mechanism 50 at times T1 and T2. Thus, as shown in FIG. 9E, the electromagnetic brake mechanism 50 is in a state of restricting the operation of the shift operation member 14 between P-S. In other words, the operation in the CW direction from the right end RE and the rotation of the shift operation member 14 in the CCW direction from the left end LE are restricted.

The shift control section 103 instructs the transmission 4 to switch the shift range to the R range at time T3 when the operation position SP reaches the range S2 at time T2.

In the example of FIGS. 9A to 9H, at time T4, the drive circuit 71 starts the protection control due to the temperature of the actuator 72 exceeding the set temperature range. In this case, as shown in FIG. 9G, at time T4, the drive circuit 71 requests the control unit 11 to cancel the control of the parking lock portion 70.

The shift control section 103 cancels the change to the R range based on the cancellation request. In other words, as shown in FIG. 9C, the operation position SP is reset to the selection position P1. Thus, as shown in FIG. 9A, the operation position SP becomes the position corresponding to the P range at time T5. Further, as shown in FIG. 9B, the shift control section 103 instructs the transmission 4 to switch to the P range at time T5.

In addition, since the shift control section 103 notifies the operation control section 114 that the shift range has been determined to be in the P range, as shown in FIG. 9D, control is executed to cause the electromagnetic brake mechanism 50 to perform the operation restriction (P-P restriction) fixed to the P range. Thus, as shown in FIG. 9E, the electromagnetic brake mechanism 50 starts the P-P restriction.

On the other hand, since the cancellation request is issued in the parking lock portion 70 at time T4, as shown in FIG. 9F, an instruction from the shift control section 103 to the drive circuit 71 becomes a standby instruction. Thus, as shown in FIG. 9H, the drive circuit 71 completes the operation started by the actuator 72 at time T3, and the actuator 72 maintains the parking lock state.

7. Summary

As described above, the shift apparatus 10 according to the embodiment to which the present invention is applied is connected to the transmission 4 of the automobile 1 having a plurality of shift ranges including a first range and a second range and performs switching of the shift ranges, the shift apparatus 10 including: the shift operation member 14 rotatably attached to the automobile 1; the angle detector 31 configured to detect the position of the shift operation member 14; the shift control section 103 configured to select the first range when the shift operation member 14 moves to the first position, to select the second range when the shift operation member 14 moves to a second position, and to allow the transmission 4 to execute switching to the selected shift range; the electromagnetic brake mechanism 50 configured to regulate the rotation of the shift operation member 14; the operation control section 114 configured to allow the electromagnetic brake mechanism 50 to regulate the rotation of the shift operation member 14 when the shift operation member 14 moves to the first position; and the shift state determination section 113 configured to determine the shift restriction state of the transmission 4. The shift control section 103 is configured to select the second range when the shift operation member 14 moves from the first position to the second position before being regulated by the electromagnetic brake mechanism 50, and the shift control section 103 is configured to select the first range when the shift state determination section 113 determines that the transmission is in a shift restriction state and the shift operation member 14 moves from the first position to the second position before being regulated by the electromagnetic brake mechanism 50, and to allow the operation control section 114 to execute the regulation by the electromagnetic brake mechanism 50.

The control method executed by the shift apparatus 10 includes: detecting the position of the shift operation member 14 rotatably attached to the automobile 1; selecting the first range when the shift operation member 14 moves to the first position, selecting the second range when the shift operation member 14 moves to the second position, and allowing the transmission 4 to execute switching to the selected shift range; using the electromagnetic brake mechanism 50 configured to regulate the rotation of the shift operation member 14 to regulate the rotation of the shift operation member 14 when the shift operation member 14 moves to the first position; selecting the second range when the shift operation member 14 moves from the first position to the second position before being regulated by the electromagnetic brake mechanism 50; and selecting the first range when the transmission 4 is in a shift restriction state and the shift operation member 14 moves from the first position to the second position before being regulated by the electromagnetic brake mechanism 50 to execute the regulation by the electromagnetic brake mechanism 50.

According to the shift apparatus 10 and the control method executed by the shift apparatus 10, when the shift operation member 14 is quickly operated in a short time, the shift range can be switched in response to the operation, and the shift range is not switched when the transmission 4 is in the shift restriction state. Accordingly, in the configuration in which the shift range of the automobile 1 is switched by the rotation of the shift operation member 14, the rotation operation of the shift operation member 14 can be appropriately regulated.

Here, it can be said that the time before being regulated by the electromagnetic brake mechanism 50 is, for example, a time before the elapse of the preset predetermined time corresponding to the time TS shown in FIG. 8. For example, the predetermined time refers to the time required until the regulation of the rotation by the electromagnetic brake mechanism 50 becomes effective. In addition, the first position corresponds to the range S1, for example, and the second position corresponds to the range S2, but the first and second positions may be selected from any of the ranges S3 to S5.

In the configuration, the transmission 4 includes the parking lock portion 70 that locks the movement or shift of the automobile 1 in the first range, and the shift state determination section 113 determines that the transmission 4 is in the shift restriction state when a hindrance occurs in the release of the lock by the parking lock portion 70. According to the configuration, when the operation of the parking lock portion 70 may be hindered, the shift range is not switched corresponding to the quick operation of the shift operation member 14. Therefore, the shift range can be switched according to the operation of the driver so as not to interfere with the operation of the automobile 1, and the operation of the shift operation member 14 can be appropriately regulated.

In the configuration, the shift apparatus 10 includes the electromagnetic brake mechanism 50 that locks the shift, and the shift state determination section 113 may determine to be in the shift restriction state when a hindrance occurs in releasing the lock of the electromagnetic brake mechanism 50. According to the configuration, when the operation of the electromagnetic brake mechanism 50 may be hindered, the shift range is not switched corresponding to the quick operation of the shift operation member 14. Therefore, the shift range can be switched according to the operation of the driver so as not to interfere with the operation of the automobile 1, and the operation of the shift operation member 14 can be appropriately regulated.

The shift state determination section 113 determines that the transmission 4 is in the shift restriction state when the temperature of the actuator 72 of the parking lock portion 70 exceeds the set temperature range. According to the configuration, it is possible to appropriately determine the possibility that the operation of the parking lock portion 70 will be hindered.

The shift control section 103 performs control to release the parking lock of the parking lock portion 70, and the shift state determination section 113 performs control to release the parking lock by the shift control section 103, and then determines that the transmission 4 is in the shift restriction state when the lock of the parking lock portion 70 is not released within the set time. According to the configuration, it is possible to appropriately determine the possibility that the operation of the parking lock portion 70 will be hindered.

The shift apparatus 10 includes the display control section 116 that allows the display 15 mounted on the automobile 1 to display the shift range selected by the shift control section 103, and the display control section 116 allows the display 15 to display the first range after the shift control section 103 selects the first range when the shift operation member 14 moves from the first position to the second position. According to the configuration, when the shift operation member 14 is quickly operated in a short time, it is possible to prevent the display 15 from being frequently switched. Therefore, the driver does not feel uncomfortable. The shift range can be appropriately switched.

In the shift apparatus 10, the first position and the second position are adjacent to each other in the operation range RA, and the operation control section 114 allows the electromagnetic brake mechanism 50 to regulate the rotation of the shift operation member 14 from the first position to the second position when the display control section 116 allows the display 15 to display the first range. For example, when the P range is displayed on the display 15 in response to the operation of the shift operation member 14, the rotation of the shift operation member 14 corresponding to the switching from the P range to the R range is regulated. According to the configuration, the shift range can be switched corresponding to the quick operation of the shift operation member 14 in a short time, and the rotation operation of the shift operation member 14 can be appropriately regulated.

8. Other Embodiments

The present invention is not limited to the configuration of the above-described embodiment, and can be implemented in various aspects without departing from the gist thereof.

In the above-described embodiment, an example is described in which the shift control section 103 executes the restriction of the electromagnetic brake mechanism 50 in step ST5 after the time TS has elapsed, but the present invention is not limited thereto. For example, the shift control section 103 may notify the operation control section 114 of the switching to the P range along with the operations of steps ST2, ST3, and ST4. In this case, the operation control section 114 enables the operation restriction of the P range by the electromagnetic brake mechanism 50 without the determination in step ST5. Also in such a case, as described above, it is possible to obtain the effect that the operation of the shift operation member 14 can be appropriately restricted.

In the above-described embodiment, an example is described in which the shift control section 103 switches the shift range according to the shift restriction state when the operation position SP moves from the range S1 to the range S2 within the time TS due to the operation of the shift operation member 14. The present invention is not limited thereto, and the operation described above may be executed, for example, when the operation position SP moves from the range S2 to the range S3 or in response to the operation of another shift operation member 14.

The display 15 is not limited to the meter panel 12, and may be provided on the instrument panel 19, for example.

Further, for example, the operation unit 25 is not limited to the configuration shown in FIGS. 3 and 4. The configuration of the angle detector 31 may be a rotary encoder or an optical sensor that detects the amount of rotation of the gear 43 or the shaft 14a of the shift operation member 14, or a detector having a gear that meshes with the gear 43. Alternatively, a detector may be used to magnetically detect a position of a magnetic body attached to the shift operation member 14. Further, the configuration for locking the rotation of the shift operation member 14 is not limited to the electromagnetic brake mechanism 50, and, for example, a pin that is fitted to the overdrive mechanism 46 to prevent the rotation of the overdrive mechanism 46 and an actuator that moves the pin. Alternatively, a motor may be used to apply a rotational force to the shift operation member 14 in a direction opposite to the operated direction.

In the above-described embodiment, the shift operation member 14 having the dial shape is illustrated. However, the operation member may have a lever shape as long as being rotatably installed on the automobile 1 and being rotated by the driver to perform the operation.

The present invention is applicable not only to the automobile 1 shown in FIG. 1, but also to all vehicles to be driven by an automatic transmission, for example, a freight vehicle, a large automobile, and a three-wheeled automobile.

The hardware configuration of the apparatus according to the present invention is not limited to the example of FIG. 7. Further, FIG. 8 shows the operation example in which the process procedure is divided into each step of the flowchart for convenience, and the operation of the apparatus according to the present invention is not limited to the order shown in FIG. 8. In addition, the timing chart shown in FIG. 9 is an example. Since FIG. 9 schematically shows the operation of the control unit 11, the actual length and the size in FIG. 9 do not have to match.

REFERENCE SIGNS LIST

1 automobile (vehicle)
2 engine
3 motor generator
4 transmission (shift mechanism)
5 drive shaft
6 wheel
7 battery
8 inverter
10 shift apparatus
11 control unit
12 meter panel
13 steering wheel
14 shift operation member (operation member)
14a shaft
15 display (display portion)
17 accelerator pedal
18 brake pedal
19 instrument panel
21 display panel
25 operation unit
31 angle detector (position detection unit)
32 vehicle speed sensor
33 accelerator pedal sensor
34 brake pedal sensor
50 electromagnetic brake mechanism (regulation mechanism)
63 shift range display portion
64 shift indicator
70 parking lock portion (shift lock portion)
71 drive circuit
72 actuator
101 traveling control section
103 shift control section
105 interface
110 shift operation determination unit
111 accelerator operation detection section
112 brake operation detection section
113 shift state determination section
114 operation control section

What is claimed is:

1. A shift apparatus that is connected to a shift mechanism of a vehicle, which is a transmission, having a plurality of shift ranges including a first range and a second range and that is configured to perform switching of the shift ranges, the shift apparatus comprising:
   an operation member rotatably attached to the vehicle;
   a sensor configured to detect a position of the operation member;
   a regulation mechanism which is an electromagnetic brake, an actuator, or a motor configured to regulate a rotation of the operation member; and
   a processor configured to function as:
   a shift control section configured to select the first range when the operation member moves to a first position, to select the second range when the operation member moves to a second position, and to allow the shift mechanism to execute switching to the selected shift range;
an operation control section configured to allow the regulation mechanism to regulate the rotation of the operation member; and
a shift state determination section configured to determine whether the shift mechanism is or is not in a shift restriction state, wherein when the operation member moves to the first position and moves from the first position to the second position within a predetermined time after the operation member moves to the first position, the shift control section is configured to select the second range when the shift state determination section determines that the shift mechanism is not in the shift restriction state, and the shift control section is configured to select the first range when the shift state determination section determines that the shift mechanism is in the shift restriction state, and to allow the operation control section to execute the regulation by the regulation mechanism, the shift mechanism includes an output shaft and a shift lock portion that includes an actuator and that is configured to lock the output shaft in the first range, the shift state determination section is configured to determine that the shift mechanism is in the shift restriction state when a hindrance occurs in releasing the lock of the shift lock portion, and the shift state determination section is configured to determine that the shift mechanism is in the shift restriction state when a temperature of the shift lock portion exceeds a set temperature range.

2. The shift apparatus according to claim 1, wherein the processor is further configured to function as a display control section configured to allow a display mounted on the vehicle to display the shift range selected by the shift control section, wherein
the display control section allows the display to display the first range after the shift control section selects the first range when the operation member moves from the first position to the second position.

3. The shift apparatus according to claim 2, wherein the first position and the second position are adjacent to each other in a rotation range of the operation member.

4. A control method of the shift apparatus according to claim 1, the control method comprising:
detecting the position of the operation member rotatably attached to the vehicle;
selecting the first range when the operation member moves to the first position, selecting the second range when the operation member moves to the second position, and allowing the shift mechanism to execute switching to the selected shift range;
using the regulation mechanism configured to regulate the rotation of the operation member to regulate the rotation of the operation member;
in selecting the shift range, determining whether the shift mechanism is or is not in the shift restriction state when the operation member moves to the first position and moves from the first position to the second position within the predetermined time after the operation member moves to the first position,
selecting the second range as the shift range when the shift mechanism is determined to not be in the shift restriction state, and
selecting the first range when the shift mechanism is determined to be in the shift restriction state, and allowing to execute the regulation by the regulation mechanism; and
determining that the shift mechanism is in the shift restriction state when the hindrance occurs in releasing the lock of the shift lock portion and when the temperature of the shift lock portion exceeds the set temperature range.

5. A shift apparatus that is connected to a shift mechanism of a vehicle, which is a transmission, having a plurality of shift ranges including a first range and a second range and that is configured to perform switching of the shift ranges, the shift apparatus comprising:
an operation member rotatably attached to the vehicle;
a sensor configured to detect a position of the operation member;
a regulation mechanism which is an electromagnetic brake, an actuator, or a motor configured to regulate a rotation of the operation member; and
a processor configured to function as:
a shift control section configured to select the first range when the operation member moves to a first position, to select the second range when the operation member moves to a second position, and to allow the shift mechanism to execute switching to the selected shift range;
an operation control section configured to allow the regulation mechanism to regulate the rotation of the operation member; and
a shift state determination section configured to determine whether the shift mechanism is or is not in a shift restriction state, wherein when the operation member moves to the first position and moves from the first position to the second position within a predetermined time after the operation member moves to the first position, the shift control section is configured to select the second range when the shift state determination section determines that the shift mechanism is not in the shift restriction state, and the shift control section is configured to select the first range when the shift state determination section determines that the shift mechanism is in the shift restriction state, and to allow the operation control section to execute the regulation by the regulation mechanism, the shift mechanism includes an output shaft and a shift lock portion that includes an actuator and that is configured to lock the output shaft in the first range, the shift state determination section is configured to determine that the shift mechanism is in the shift restriction state when a hindrance occurs in releasing the lock of the shift lock portion, and the shift control section is configured to perform control to release the lock of the shift lock portion, and the shift state determination section is configured to determine that the shift mechanism is in the shift restriction state when the lock of the shift lock portion is not released within a set time after the shift control section performs control to release the lock.

6. The shift apparatus according to claim 5, wherein the processor is further configured to function as a display control section configured to allow a display mounted on the vehicle to display the shift range selected by the shift control section, wherein
the display control section allows the display to display the first range after the shift control section selects the first range when the operation member moves from the first position to the second position.

7. The shift apparatus according to claim 6, wherein the first position and the second position are adjacent to each other in a rotation range of the operation member.

\* \* \* \* \*